United States Patent [19]

Hvezda et al.

[11] Patent Number: 4,744,617
[45] Date of Patent: May 17, 1988

[54] MOUNTING OPTICAL BUSBARS ON BACKPLANES

[75] Inventors: Jaroslav M. Hvezda, Nepean; Jack F. Dalgleish, Ottawa; David A. Kahn, Nepean, all of Canada

[73] Assignee: Northern Telecom Limited, Montreal, Canada

[21] Appl. No.: 840,244

[22] Filed: Mar. 17, 1986

[51] Int. Cl.⁴ ............................................. G02B 6/26
[52] U.S. Cl. ............................ 350/96.15; 350/96.16; 350/96.18; 350/96.20
[58] Field of Search ............... 350/96.15, 96.18, 96.16, 350/96.20

[56] References Cited

U.S. PATENT DOCUMENTS

| 4,378,143 | 3/1983 | Winzer | 350/96.15 |
| 4,400,054 | 8/1983 | Biard et al. | 350/96.15 |
| 4,576,436 | 3/1986 | Daniel | 350/96.15 X |

FOREIGN PATENT DOCUMENTS

| 3413704 | 10/1985 | Fed. Rep. of Germany | 350/96.15 |
| 0111811 | 9/1981 | Japan | 350/96.15 |
| 8503179 | 7/1985 | World Int. Prop. O. | 250/96.16 |

Primary Examiner—Gene Wan
Assistant Examiner—James C. Lee
Attorney, Agent, or Firm—Thomas Adams

[57] ABSTRACT

A mounting arrangement for mounting an optical conductor on a "photonic" backplane provides for simple, accurate positioning during installation and easy access to, and removal of, the optical conductor when in service. The optical conductor constitutes a "busbar" in that it has a series of reflector surfaces spaced along its length to permit distribution or aggregation of several light signals. In one embodiment, an individual support is provided at each reflector/circuit card location. Each support is a seating member which houses a lens to couple light between the optical conductor and the circuit card. In another, preferred, embodiment the optical conductor is housed in a channel in a guide rail mounted upon the backplane. Separate cover members are releasably mounted upon the guide rail adjacent each circuit card. Each cover member has an aperture and lens to couple light between the reflector and the circuit card. The aperture and lens may be in a boss which couples in spigot-and-socket fashion with a tubular lens-carrying coupled mounted on the circuit card.

30 Claims, 5 Drawing Sheets

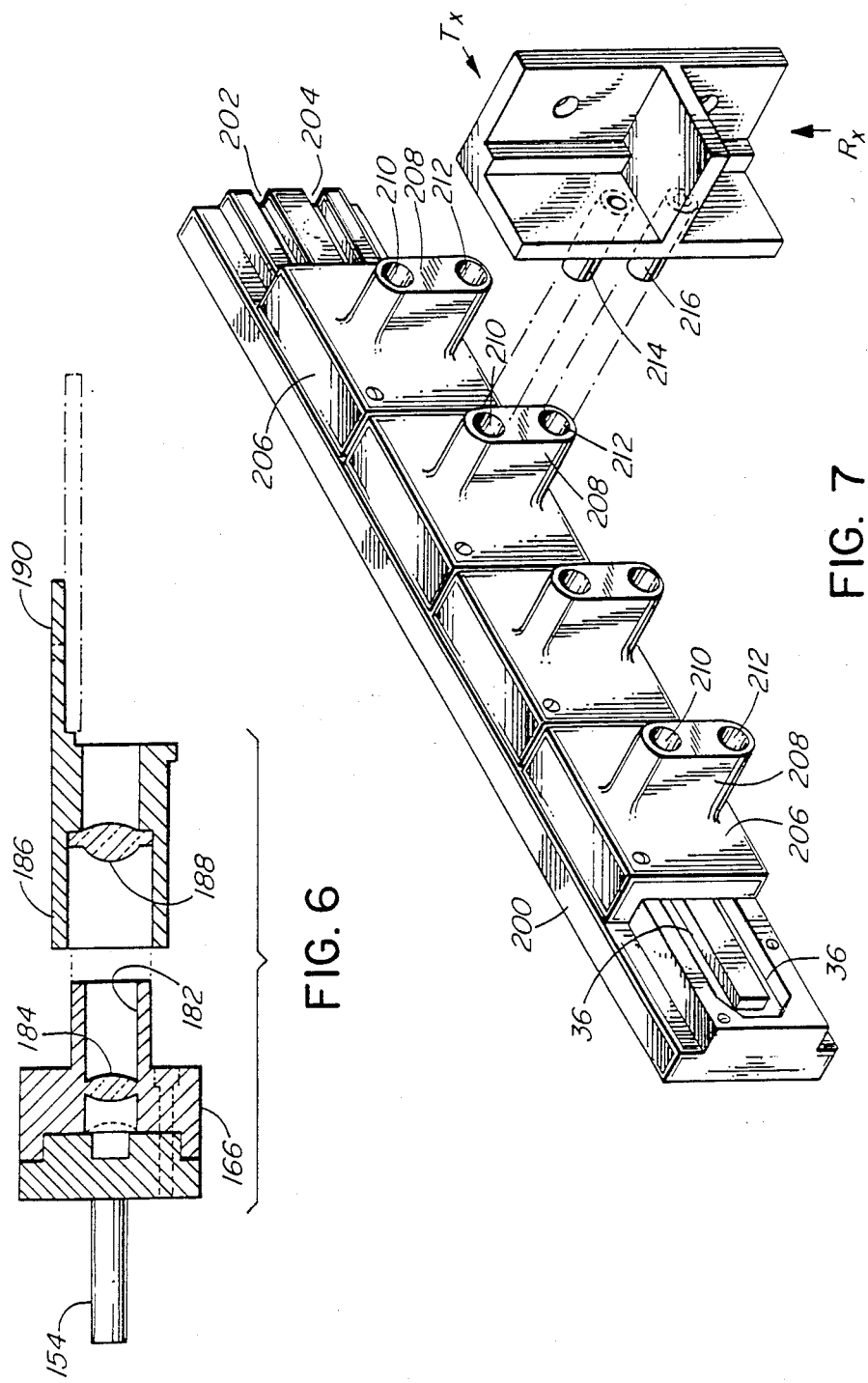

MOUNTING OPTICAL BUSBARS ON BACKPLANES

This application relates to U.S. patent application No. 840,262 filed concurrently herewith.

BACKGROUND OF THE INVENTION

The invention relates to mounting arrangements for optical conductors such as are used for making connections within electronic and/or photonic equipment. Photonic equipment uses light instead of electric current, e.g. uses optical communication links.

The increasing transmission rates in present-day computer and telecommunications equipment have led to the use of optical conductors, often called waveguides, for the main traffic highways, which may have to operate at rates of 1 gigabit and more. In telecommunications equipment, they have been used to interconnect circuit cards which extend perpendicularly from a backplane. (See, for example, copending patent application Ser. No. 593,682 by A. Graves, assigned to the same assignee as this invention.) In such applications, the optical waveguide/conductor comprises an elongate moulding of optically transmissive plastics material.

It is desirable for the optical conductor to be readily accessible for replacement or adjustment to suit different circuit card configurations.

SUMMARY OF THE INVENTION

According to one aspect of the present invention there is provided a mounting arrangement for mounting, on a backplane, an optical conductor in the form of a rod of optically-transmissive material having a plurality of reflector means spaced apart along its length for reflecting light to emerge laterally therefrom, said mounting arrangement comprising a plurality of seating members each having a seating to positively locate the optical conductor to extend transversely thereto, securing means for anchoring the seating member to said backplane, and an aperture extending away from the seating to convey light between said optical conductor and one of a corresponding plurality of optical elements spaced laterally from said optical conductor.

Said securing means may, for example, comprise a spigot for securing the seating member to said backplane or the like. The light-coupling means may conveniently comprise a lens for directing light from the optical conductor to the associated circuit card, or vice versa. The lens may be mounted across said aperture extending away from said seating.

The mounting arrangement may be arranged to mount the optical conductor on one side of the backplane and the circuit cards be mounted on the other side. Then the seating members may have the light-coupling means between the seating and the securing means. The latter may be adapted to locate the seating member over or adjacent to a hole in the backplane so that light can pass through the hole to the circuit card, or vice versa. Alternatively, the optical conductor may be mounted on the same side of the backplane as the circuit cards. The seating members may then have the seating between the securing means and the light-coupling means and the circuit cards be mounted so as to straddle the optical conductor.

According to a second aspect of the invention, there is provided a mounting arrangement, for mounting upon a backplane, an optical conductor in the form of a rod of optically transmissive material having a plurality of reflector means spaced apart along its length for reflecting light to emerge laterally therefrom, said mounting arrangement comprising an elongate member having a longitudinal channel to receive and locate said rod, securing means for securing said elongate member to said backplane, and light-coupling means disposed adjacent said channel for conveying light between said plurality of reflectors, and a corresponding plurality of optical elements spaced laterally from said rod. In use, said elongate member will be mounted with one side adjacent said backplane. At its opposite side, i.e. remote from the backplane when mounted, the channel will house said optical conductor. The light-coupling means will couple light between each of said reflectors and a corresponding one of a plurality of optical elements, typically mounted upon circuit cards extending away from said backplane.

The channel locates the optical conductor accurately relative to the securing means, and hence relative to the backplane and the circuit cards. The light-coupling means may be separate from the elongate member, conveniently a plurality of cover members each adapted to straddle cover the channel. Each cover member may support a lens in such a position that its optical axis will align substantially with one of the reflectors of the installed optical conductor. Alternatively, a single cover member might be provided, equipped with a plurality of light-coupling means, for example comprising lenses.

The light-coupling means may further comprise a second lens mounted on each of the circuit cards, so that its optical axis will substantially align with that of the lens carried by the corresponding cover member.

The securing means may conveniently comprise a plurality of spigots spaced apart along the elongate member. The elongate member may then be installed by inserting the spigots through corresponding holes in the backplane. Alternatively, tapped holes could be provided in the elongate member so that it could be mounted using screws.

The elongate member may have a plurality of channels, one for each of a plurality of optical conductors, e.g. one or more for transmitting and the other(s) for receiving. The light-coupling means may then comprise several lenses mounted side-by-side, one for each optical conductor.

According to a further aspect of the invention, there is provided apparatus comprising a backplane and a plurality of circuit cards mounted to extend perpendicularly therefrom, and an optical conductor of the aforementioned kind mounted on said backplane by a mounting arrangement of the first or second aspect. Each circuit card has an optical element, for example a receiver, to receive light reflected from an inclined reflector surface of the optical conductor, or an optical element, for example a transmitter, to direct light to the associated inclined reflector surface.

BRIEF DESCRIPTION OF THE DRAWINGS

An embodiment of the invention will now be described by way of example only and with reference to the accompanying drawings in which:

FIG. 6 is a cross-sectional side view on line III—III of part of the second embodiment;

FIG. 7 is a perspective view of a third embodiment; and

DESCRIPTION OF THE PREFERRED EMBODIMENT

Figure 1:
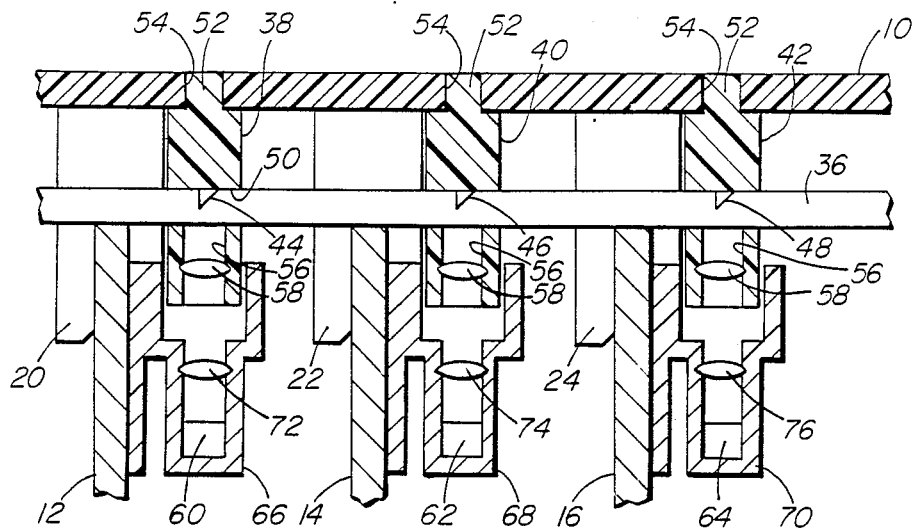
FIG. 1 is a cross-sectional partial view of apparatus comprising an backplane and a plurality of circuit cards, the latter interconnected optically by way of an optical conductor embodying one aspect of the invention.

Referring to FIG. 1, a backplane 10, which may be a printed circuit board or other planar member, has a plurality of circuit cards 12, 14, and 16 mounted on its face so as to extend perpendicularly to the backplane 10. The circuit cards 12, 14, and 16 are mounted by clamps 20, 22 and 24, respectively. An optical conductor 36 is mounted on the same face of the backplane 10 by a set of seating members 38, 40, and 42 spaced apart along its length.

The optical conductor 36 has a series of reflectors formed by inclined surfaces 44, 46 and 48 in register with the seating members 38, 40 and 42, respectively. The inclined surfaces 44, 46 and 48 are formed as mitred ends of a series of circular cavities. For a more detailed description of such an optical conductor, the reader is referred to copending patent application Ser. No. 840,262 by D. Kahn et al, assigned to the same assignee as this invention, and which is incorporated herein by reference. Each seating member 38, 40, or 42 comprises a block of aluminum having a seating in the form of a square apaerture 50 to receive and positively locate the optical conductor 36 which has a square cross-sectional shape. The optical conductor 36 is a close fit in the aperture 50 and so is accurately located with its bottom facet parallel to the backplane 10. The base of each seating member 38, 40 or 42 has securing means in the form of a spigot 52 which projects beyond the end of the seating member to engage in a corresponding hole 54 in the backplane 10. A cylindrical cavity 56 extends through each seating member 38, 40 or 42, communicating between the seating 50 and the opposite end of the seating member. A lens 58 is supported to extend across the cavity 56 between the base of square aperture 46 and the free end. Each lens 58 is arranged with its optical axis perpendicular to the longitudinal axis of the optical conductor 36 and aligned with a reflector of the optical conductor and with an optical element in the form of a receiver or transmitter device 60, 62 or 64 mounted on the corresponding one of the circuit cards 12, 14, and 16. The optical transmitters may be light-emitting diodes and the receivers photodiodes. Alternatively, and perhaps preferably, lasers could be used.

The optical elements 60, 62 and 64, respectively, are each housed in the closed end of one of three tubular housings 66, 68 and 70, respectively, mounted upon the circuit cards 12, 14 and 16, respectively. Within the bores of the tubular housings 66, 68 and 70 are lenses 72, 74 or 76, respectively, for collecting light from the corresponding one of the lenses 58 in the seating members 38, 40 and 42, respectively, and directing it towards the associated one of receivers 60, 62 and 64. An advantage of the two-lens configuration is that minor misalignment of the receivers or transmitters with the inclined reflector surfaces is not of consequence.

The optical conductor 36 shown in FIG. 1 has its inclined reflector surfaces 44, 46 and 48, respectively, positioned within the confines of the respective seatings. In operation, light travelling along the optical conductor 36 will be reflected at each reflector surface, pass through the associated pair of lenses, and impinge on the receiver. In this case, the transmitter is assumed to be further along the optical conductor, and associated with a reflector surface inclined oppositely to those shown in the Figure, or inclined the same way but at the opposite side of the conductor 36. Obviously, the receivers could be replaced by transmitters, reversing the direction of the light.

Figure 2:
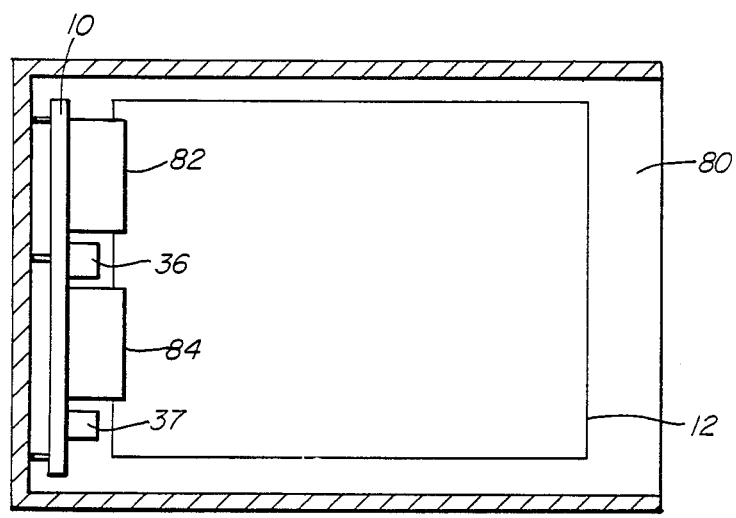
FIG. 2 is a sectional view of a cabinet having a backplane, circuit cards and an optical conductor.

FIG. 2 shows an equipment cabinet 80 housing the backplane 10 and set of circuit cards, only one of which, 12, is shown. The circuit card 12 is mounted onto the backplane 10 by a pair of clamps 82, 84 spaced apart along the edge of the circuit card 12. Between the clamps 82 and 84 an optical conductor 36 is mounted to extend perpendicularly to the plane of the circuit card 12. The depth of the optical conductor 36 is so arranged that the edge of the circuit card extends across the optical conductor 36 in bridging across the gap between the two clamps 82 and 84, respectively. A second optical conductor 37 is shown extending parallel to the first optical conductor 36 but adjacent the opposite end of clamp 84. With such a pair of optical conductors, one can transmit light to the circuit cards and the other receive light from them.

Figure 3:
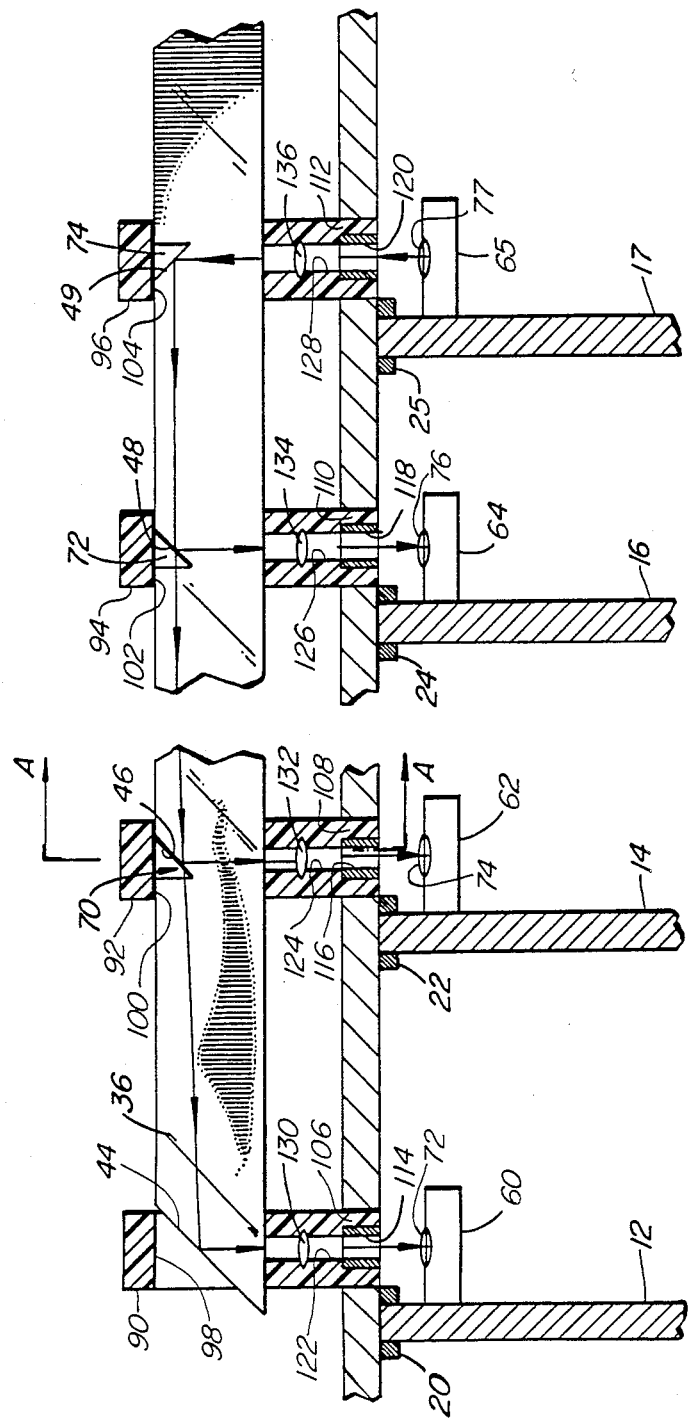
FIG. 3 is a view corresponding to FIG. 1 of a modified mounting arrangement.
Figure 4:
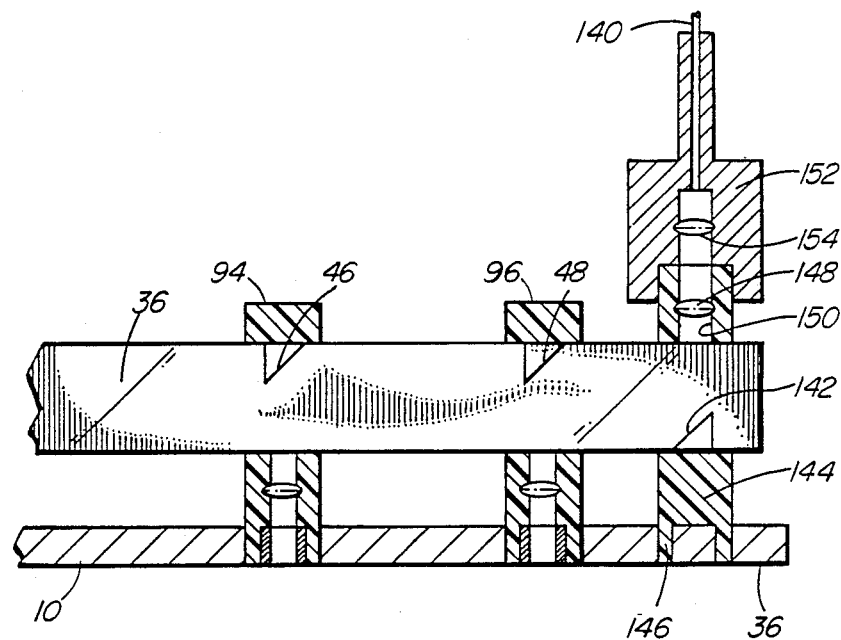
FIG. 4 is a partial view of one end of the optical conductor showing its coupling, by means of a connector, to an optical fiber.

FIGS. 3 and 4 show a modified mounting arrangement which is similar to that shown in FIG. 1, so corresponding features have the same reference numeral. The mounting arrangement of FIGS. 3 and 4 differs from that of FIG. 1 in that the optical conductor 36 is mounted on the opposite side of the backplane 10 to the circuit cards 12, 14, 16 and 17. The seating members 90, 92, 94 and 96, respectively, again comprise a square aperture 98, 100, 102, 104 providing a seating for the optical conductor 36. At one end the seating members 90, 92, 94, 96 have spigots 106, 108, 110 and 112, respectively, for securing them to the backplane 10. The spigots 106, 108, 110 and 112 each surrounding a corresponding one of a set of holes 114, 116, 118 and 120 which extend through the backplane 10. Extending between the square apertures 98, 100, 102, 104 and the spigots 106, 108, 110 and 112 the seating members each have a hole 122, 124, 126, 128. Lenses 130, 132, 134 and 136 are mounted in the holes 122, 124, 126, 128, respectively.

Thus, when the optical conductor is mounted as shown in FIG. 3, light can pass from the reflector surfaces 44, 46, 48 through the holes in the seating members and aligned holes in the backplane 10 to impinge upon receivers 60, 62, 64, respectively. Each receiver 60, 62 or 64 has a lens 72, 74 or 76 associated with it. In FIG. 3, oppositely inclined reflector surface 49 is shown associated with a transmitter 65 on circuit card 17.

It may be convenient for the optical conductor to receive a light signal from, say, an optical fiber which is behind the backplane 10. The embodiment of FIG. 4 shows a convenient way of coupling such an optical fiber 140 to the optical conductor 36. The latter is similar to the optical conductor shown in FIGS. 1-3, in that it has a series of reflector surfaces 46, 48, etc. but differs in that the reflector surface 142, arranged to receive light from the optical fiber 140, is on the opposite side of the optical conductor 36, i.e. adjacent the backplane 10. The associated support member 144 has spigots 146 securing it to the backplane 10, and a lens 148 mounted in a hole 150 in the part of the support member 144, that is on the side away from the backplane 10.

The optical fiber 140 is terminated in a connector 152 which houses a second lens 154. The connector 152 fits over the end of the support member 144 so that the axes of the lenses 148 and 154 are substantially aligned.

Thus, the light signal can be brought into the cabinet from the rear, i.e. behind the backplane 10, as is usual. It is fed into the optical conductor 36 via the connector 152, lenses 148, 154 and directed along the optical conductor 36 by the reflector surface 142. The other reflector surfaces 92, 94 etc. distribute the signal to the circuit cards as described with respect to FIG. 1.

Figure 5:
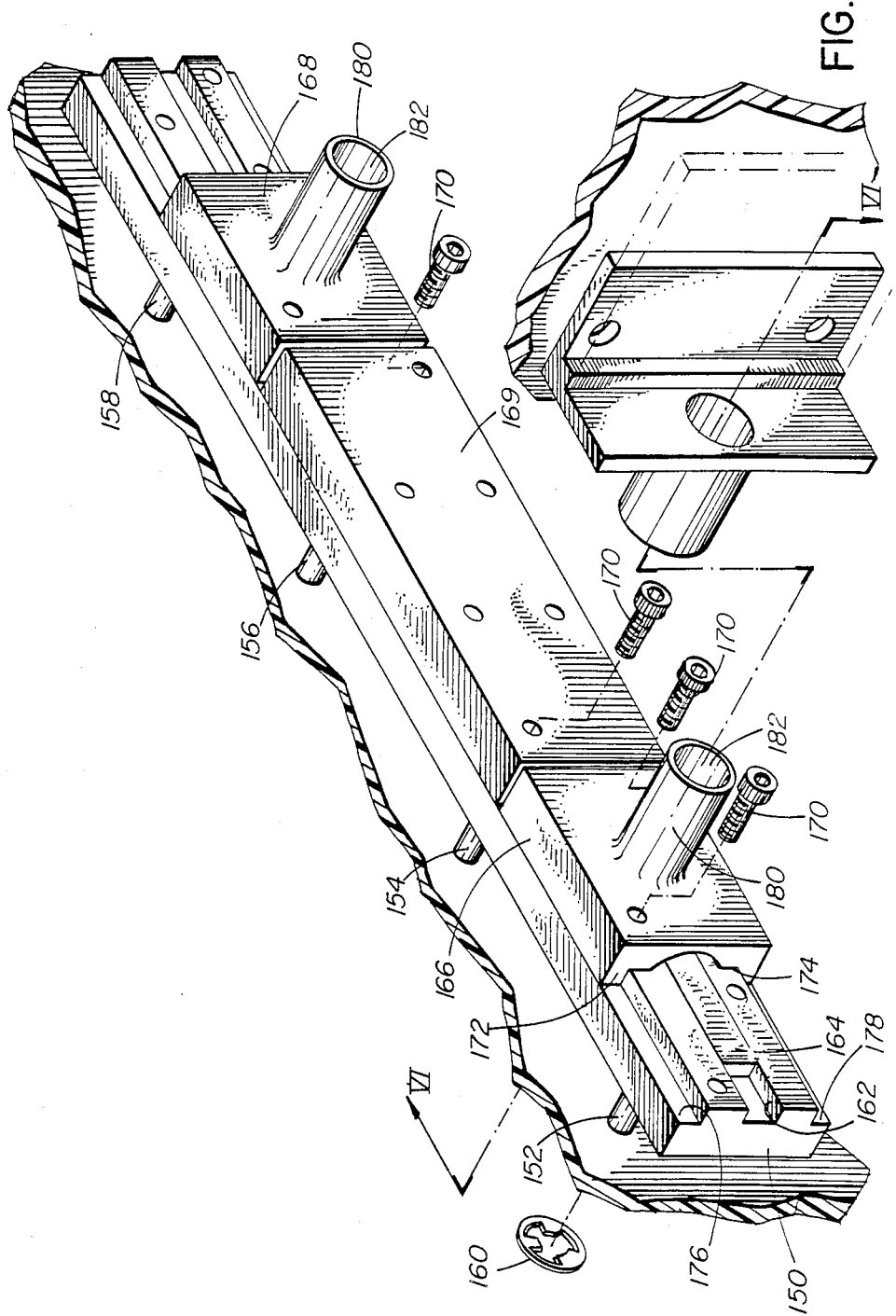
FIG. 5 is a perspective view of a second embodiment.

In the embodiment shown in FIGS. 5, 6 and 7, the mounting arrangement comprises an elongate support member in the form of an aluminum guide rail 150 attached to the backplane 10 by securing means in the form of a plurality of spigots 152, 154, 156 and 158, respectively. The spigots extend from one side of the rail through corresponding holes in the backplane 10 and are retained by "push-on" spring washers 160 (only one shown). The opposite side of the rail 150 has a seating groove 162 extending throughout its length. The groove 162 has a square cross-section which is a close fit for an optical conductor 164 which is housed in the groove 162. The light-coupling means mounted on the guide rail 150 comprises a plurality of cover members 166, 168, each secured to the rail 150 by screws 170. The cover members 166 and 168 are positioned adjacent respective circuit cards and a blanking cover 169 covers the guide rail 150 between them.

Each cover member 166, 168, 169, is channel-shaped and its edge portions 172, 174 locate in recesses 176, 178, respectively, at opposite edges of the guide rail 150. A boss 180 protrudes from the middle of each cover member 166, 168, away from the guide rail 150. A hole or aperture 182 extends through the boss 180 to communicate with the seating groove 162. A lens 184 (FIG. 6), is mounted in the hole 182. Each cover member 166, 168 is so positioned on the guide rail 150 that the optical axis of the lens 184 extends through the associated reflector of the optical conductor 36.

The part of the light-coupling means mounted on the circuit card comprises a tubular part 186, which is arranged to fit spigot-and-socket fashion onto the boss 180. A second lens 188 (FIG. 6) is mounted within the tubular part 186, which is attached to the circuit card 12 by means of a bracket 190. The optical receiver, for example a photodiode (or a transmitter, for example an LED) is mounted in the end of the tubular part beyond the lens 188.

During assembly, the clamps/connectors for the circuit cards are positioned by means of jig quite accurately relative to the guide rail 150 and hence to the reflector surfaces of the optical conductor. Hence, when the circuit cards are installed there is minimal misalignment of the receiver/transmitter with the associated reflector. Any such slight misalignment is tolerated by virtue of the two-lens optical system.

The mounting arrangement shown in FIG. 5 may be deployed in the equipment as previously described with reference to FIG. 2.

FIG. 7 shows a modified mounting arrangement in which an elongate support member in the form of guide rail 200 has two parallel esating grooves 202, 204, each for an optical conductor 36. Each light-coupling means comprises, as before, a cover member 206 but in this case with an oblong boss 208 with two lens-carrying holes 210, 212, one for each seating groove 202, 204. The part of the light-coupling means on the circuit card also has two lens-carrying tubular parts 214 and 216 to cooperate with the two holes 210 and 212, respectively.

The two seating grooves 202, 204 may carry separate optical conductors, one for transmitting to the circuit cards and the other for receiving from them, the reflectors being inclined in the appropriate direction. Alternatively, a single U-shaped optical conductor might be provided, one limb in each groove, suitable reflectors at the bight portion serving to reflect the light from one limb through 180 degrees to return along the other limb.

An advantage of mounting the optical conductor on the same side of the backplane as the circuit cards is that it is readily accessible once the circuit cards have been removed. The embodiments having separate cover members as part of the light-coupling means are especially advantageous because the optical conductor can be replaced without any need to obtain access to the rear of the backplane. All that is needed is removal of the circuit cards and removal of the cover members, which can be done from the front of the cabinet.

Figure 8:
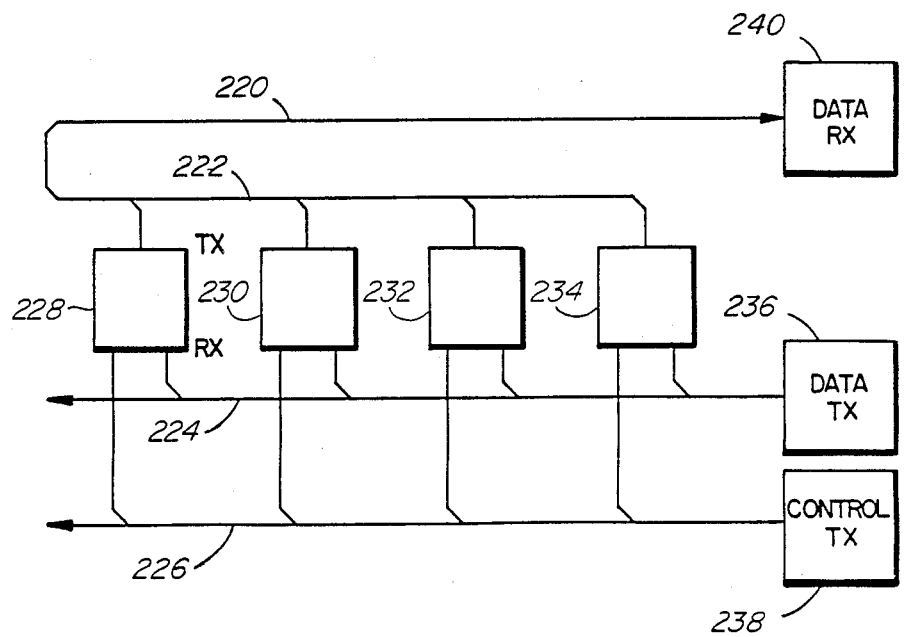
FIG. 8 is a schematic view showing a particular application of one embodiment of the invention.

In the particular embodiment illustrated in FIG. 8, four optical conductors 220, 222, 224 and 226 extend parallel to each other on a backplane-mounted support (not shown). One transmitter and two receivers are mounted on each of four circuit cards 228, 230, 232 and 234, respectively. The transmitters and receivers are connected to optical conductors 222 and 224, respectively. Optical conductor 224 is shown coupled at one end (light can, of course, be launched into these optical conductors through one end) to a transmitter 236 and is coupled via its reflectors to first ones of the receiver ports of circuit cards 228, 230, 232 and 234. The other receiver ports are coupled laterally to the optical conductor 226, which is coupled at its end to a control/-supervisory transmitter 238.

It is preferred for the data signals in the optical conductors 222, 224 and 226, coupled to the circuit card, to travel in the same direction. This simplifies synchronization. Accordingly, optical conductor 222 is coupled by a U-bend (actually two 45 degree bends such as disclosed in our copending U.S. patent application Ser. No. 906,708, to the fourth optical conductor 220, which carries the data signals in the opposite direction to the data receiver 240.

Various modifications of the specific embodiments are possible without departing from the scope of the invention. For example, the rod may be of other polygonal shapes, such as hexagonal, triangular or octagonal, and the inclined reflector surfaces may be provided in the same surface as that from which the light emerges.

In either the embodiment of FIG. 1 or the embodiment of FIG. 4, it may be preferable for the inclined surface (48 or 142) which receives light from the transmitter to be larger than usual, for example the whole of the oblique cross-sectional area of the conductor.

It will be appreciated that although the reflector surfaces in the specific embodiment will reflect only about 2-4% of the light travelling along the conductor, if light is being transmitted into the waveguide via such surfaces, they will reflect substantially all of the light. This is mainly because the lens system enables one to image the source onto the reflector so that substantially all of the light gets transmitted along the conductor. The difference is that the transmitted light is still concentrated into a few modes, whereas the light in the waveguide comprises many more modes.

Moreover, although the reflector means in the specific embodiment comprise planar surfaces, other types of reflective surfaces might be employed, for example the prismatic reflector surface disclosed and claimed in our copending U.S. application Ser. No. 906,708, or other means employing total internal reflection.

The specific embodiment comprises a so-called directional coupler inasmuch as the inclined surface at each tap point is inclined in one direction only. It is envisaged that a bidirectional coupler could be provided by forming two oppositelyinclined surfaces at each tapping point. Then one would reflect light to travel, or travelling in, one direction along the waveguide and the other would reflect light to travel, or travelling in, the opposite direction.

Of course, the oppositely-inclined surfaces might be spaced apart, perhaps to serve different circuit cards or different parts of the same card.

Although circular cavities are preferred for ease of mould manufacture, other shapes are comprehended by the invention; in particular, square or otherwise rectangular cross-section might be preferred because such a tap has maximum efficiency due to minimum loss of light.

It should be appreciated that the inclined surfaces may be provided in any combination of orientation to give 1:n distribution, n:1 concentration or multiplexing, or even n:m, i.e. plural transmitters to plural receivers.

Also, the rod may be of other polygonal shapes, such as hexagonal or octagonal, and the inclined reflector surfaces may be provided in the same surface that the light emerges from.

What is claimed is:

1. A mounting arrangement for mounting, upon a backplane, an optical conductor in the form of a rod of optically transmissive material having a plurality of reflector means spaced apart along its length for reflecting light to emerge laterally therefrom, said mounting arrangement comprising an elongate member having a longitudinal channel to receive and locate said rod, securing means for securing said elongate member to said backplane, and light-coupling means disposed adjacent said channel for conveying light between said plurality of reflectors, and a corresponding plurality of optical elements spaced laterally from said rod.

2. A mounting arrangement as defined in claim 1, wherein said elongate member comprises a rail and said channel comprises a groove in one face of said rail.

3. A mounting arrangement as defined in claim 2, wherein said light-coupling means comprising at least one cover member attachable to said elongate member to cover said channel, said cover member having an aperture to align with said channel so as to convey light between the underlying optical conductor and the associated optical element.

4. A mounting arrangement as defined in claim 3, wherein said light-coupling means comprises a lens mounted across said aperture.

5. A mounting arrangement as defined in claim 1 or 2, wherein said elongate member has two channels and said light-coupling means is adapted to couple light between two optical conductors, one in each channel, and two optical elements, respectively.

6. A mounting arrangement as defined in claim 3, comprising a plurality of said cover members securable along said elongate member.

7. A mounting arrangement as defined in claim 4, comprising a plurality of said cover members securable along said elongate member.

8. A mounting arrangement for mounting, on a backplane, an optical conductor in the form of a rod of optically-transmissive material having a plurality of reflector means spaced apart along its length for reflecting light to emerge laterally therefrom, said mounting arrangement comprising a plurality of seating members each having a seating to positively locate the optical conductor to extend transversely thereto, securing means for anchoring the seating member to said backplane, and an aperture extending away from the seating to convey light between said optical conductor and one of a corresponding plurality of optical elements spaced laterally from said optical conductor.

9. A mounting arrangement as defined in claim 8, wherein said seating comprises an aperture shaped to conform closely to the shape of said rod.

10. A mounting arrangement as defined in claim 8, wherein said aperture extending away from said seating communicates with a surface of the seating member remote from said securing means.

11. A mounting arrangement as defined in claim 8, wherein said aperture extending away from said seating communicates with that end of the seating member adapted to be secured to said backplane.

12. A mounting arrangement as defined in claim 8, 9, 10 or 11, wherein said securing means comprise one or more spigots protruding endwise from said seating member.

13. A mounting arrangement as defined in claim 8, 9, 10 or 11, wherein said securing means comprises a plurality of screw-threaded holes.

14. A mounting arrangement as defined in claim 8, 9, 10 or 11, wherein said seating member further comprises a lens mounted in said aperture extending away from the seating.

15. A mounting arrangement as defined in claim 10, wherein said seating member further comprises a lens mounted in said aperture extending away from the seating.

16. A mounting arrangement as defined in claim 11, wherein said seating member further comprises a lens mounted in said aperture extending away from the seating.

17. Apparatus comprising a backplane and a plurality of circuit cards extending from one face thereof, each circuit card carrying an optical element, an optical conductor mounted on the other face of said backplane, said optical conductor comprising an optically transmissive rod having a planar surface extending along its length and a plurality of reflector means spaced apart along its length at intervals corresponding to the spacing of said circuit cards, said reflector means each being inclined relative to the longitudinal axis of said rod so as to reflect light travelling along the length of the rod to emerge through said planar surface and impinge upon the optical element on the adjacent circuit card or to reflect light leaving an optical element on said circuit card to travel along said rod.

18. Apparatus as defined in claim 17, including support means for supporting said optical conductor relative to said backplane, said support means comprising a seating member having a seating to positively locate the optical conductor, securing means for anchoring said seating member to said backplane, and lens means for conveying light between a reflector means adjacent said seating and an optical element on the adjacent circuit card.

19. Apparatus as defined in claim 17 or 18, wherein each said lens means is aligned with a respective hole through said backplane.

20. Apparatus as defined in claim 17 or 18, including a second lens mounted on each circuit card for cooperating with the associated first-mentioned lens means to convey light between the first lens and the optical element.

21. Apparatus as defined in claim 17 or 18, wherein said optical conductor comprises a planar surface on each opposite side of the rod, a plurality of reflector means spaced apart along one planar surface and at least one reflector means disposed in the other planar surface.

22. Apparatus as defined in claim 21, further comprising an optical element disposed for optical communication with said at least one reflector means.

23. Apparatus as defined in claim 17 or 18, wherein at least one reflector means extends across the entire rod.

24. Apparatus comprising a backplane, a plurality of circuit cards extending from one side of said backplane and at least one optical conductor extending across said one side of said backplane transversely to the plane of each circuit card, said optical conductor comprising a rod of light-transmissive material having a plurality of reflectors spaced apart along its length for diverting light between a path along the optical conductor and a path lateral to the length of the optical conductor, the optical conductor being mounted by means of a mounting arrangement comprising at least one support means having securing means for securing said support means with one side towards the backplane, the support means having in its opposite side a seating, the optical conductor being located by the seating with each of its said reflectors registering with a corresponding one of a plurality of optical elements on the neighboring circuit cards, the mounting arrangement further comprising light-coupling means for optically coupling each said reflector and said corresponding one of said plurality of optical elements.

25. Apparatus as defined in claim 24, wherein said support means comprises an elongate member having at least one channel extending in its said opposite side, said optical conductor being seated in said channel, said light-coupling means comprising a cover member adapted to fit over said channel and having an aperture to permit light to pass between the reflector and the optical element.

26. Apparatus as defined in claim 25, wherein said light-coupling means further comprises a tubular part mounted on each said circuit cart, and said cover member comprises a boss extending away from said backplane, said aperture being in said boss, the arrangement being such that said boss and said tubular part couple in spigot-and-socket fashion.

27. Apparatus as defined in claim 26, wherein the boss and tubular part each house a lens with its optical axis substantially aligned with said reflector and said optical element.

28. Apparatus as defined in claim 24, comprising a plurality of optical conductors extending parallel to each other but spaced apart, one of said optical conductors having a said plurality of reflectors and being coupled to a transmitter for transmitting light signals to a plurality of circuit cards, a second optical conductor having a said plurality of reflectors and being coupled to receive light signals from said circuit cards, and a third optical conductor being arranged to convey signals from the second optical conductor to a receiver, the arrangement being such that the signals in the first and second optical conductors travel in the same direction.

29. Apparatus as defined in claim 26, wherein said support means comprises two parallel channels, each seating an optical conductor, said light-coupling means being adapted to provide two light paths, one for each optical conductor and a corresponding one of a pair of optical devices on said circuit card.

30. Apparatus comprising a backplane and a plurality of circuit cards extending from one face thereof, each circuit card carrying an optical element, a plurality of optical conductors mounted parallel to each other on the other face of said backplane, each said optical conductor comprising an optically transmissive rod, at least a first and a second of said optical conductors having a plurality of reflector means spaced apart along its length at intervals corresponding to the spacing of said circuit cards, said reflector means each being inclined relative to the longitudinal axis of said rod so as to reflect light travelling along the length of the rod to emerge through said planar surface and impinge upon the optical element on the adjacent circuit card or to reflect light leaving an optical element on said circuit card to travel along said rod, said first optical conductor being coupled to a transmitter and serving to transmit light signals to a plurality of circuit cards, said second optical conductor being coupled to receive light signals from said circuit cards, and a third optical conductor being arranged to convey signals from the second optical conductor to a receiver, the arrangement being such that the signals in the first and second optical conductors travel in the same direction.

* * * * *